United States Patent
Horst

(10) Patent No.: US 7,372,586 B2
(45) Date of Patent: May 13, 2008

(54) METHOD, SOFTWARE PRODUCT, AND COMPUTER TO GENERATE AND INTERPRET AN IPDS DATA STREAM

(75) Inventor: Joachim Horst, Erding (DE)

(73) Assignee: Oce Printing Systems GmbH, Poing (DE)

( * ) Notice: Subject to any disclaimer, the term of this patent is extended or adjusted under 35 U.S.C. 154(b) by 935 days.

(21) Appl. No.: 10/669,510

(22) Filed: Sep. 24, 2003

(65) Prior Publication Data

US 2004/0130742 A1 Jul. 8, 2004

(30) Foreign Application Priority Data

Sep. 30, 2002 (DE) ............... 102 45 530

(51) Int. Cl.
G06F 3/12 (2006.01)
G06F 15/00 (2006.01)
G06K 1/00 (2006.01)

(52) U.S. Cl. .......... 358/1.13; 358/1.9; 358/1.15; 358/1.18

(58) Field of Classification Search .......... 358/1.9, 358/1.13, 1.15, 1.18
See application file for complete search history.

(56) References Cited

U.S. PATENT DOCUMENTS 5,592,683 A   1/1997   Chen et al.

FOREIGN PATENT DOCUMENTS

DE   192 35 2542   8/2002
DE   695 24 381    8/2002

OTHER PUBLICATIONS

IBM Data Stream and Object Architectures—Intelligent Printer Data Stream Reference.
Universal Printer Pre- and post-processing interface-Version 1.02 Jul. 2002 p. 1-175.

Primary Examiner—Twyler Lamb Haskins
Assistant Examiner—Yixing Qin
(74) Attorney, Agent, or Firm—Schiff Hardin LLP

(57) ABSTRACT

In a method for generating an IPDS data stream, different levels are defined with level numbers, whereby in each level a group of print data is combined on which the same operation is implemented. The operations are defined by operation numbers. A linkage exists between the level numbers and the operation numbers such that an operation number can be unambiguously assigned to a level number so that it can be determined using the linkage which level is provided for which operation. It is not necessary to generate and to maintain complex tables in order to be able to administrate the level corresponding to the required specification.

11 Claims, 3 Drawing Sheets

| Operation number | Level number |
|---|---|
| FF | 4 |
| FE | 3 |
| FD | 2 |
| FC | 1 |
| FB | 4 |
| ⋮ | ⋮ |
| 08 | 1 |
| 07 | 4 |
| 06 | 3 |
| 05 | 2 |
| 04 | 1 |
| 03 | 4 |
| 02 | 3 |
| 01 | 2 |
| 00 | 1 |

SGO Level= X'80', Operation=X'01' (Keep group together as a print unit)
SGO Level= X'60', Operation=X'03' (Save pages)
SGO Level= X'40', Operation=X'03' (Save pages)
SGO Level= X'20', Operation=X'01' (Keep group together as a print unit)
SGO Level= X'20', Operation=X'04' (Finish)

DGB Initiate, Level= X'80', Group ID triplet= [Format= X'02' (VM print-data format)]
   Page1
   DGB Initiate, Level= X'60',
      Group ID triplet= [Format= X'08' Variable-length group ID= "Outer_Document"]
     Page2
     Page3
     DGB Initiate, Level= X'40',
       Group ID triplet= [Format= X'08' Variable-length group ID= "Inner_Document"]
       Page4
       Page5
       Page6
     DGB Terminate, Level= X'40'
     Page7
     Page8
   DGB Terminate, Level= X'60'
   Page9
   DGB Initiate, Level= X'20', Group ID triplet= [Format= X'02' (VM print-data format)]
     Finishing Operation triplet= [Corner staple, Top-left corner]
     Page10
     Page11
     Page12
   DGB Terminate, Level= X'20'
   Page13
   Page14
   Page15
DGB Terminate, Level= X'80'

FIG.1
(PRIOR ART)

| Offset | Type | Name | Range | Meaning | Required |
|---|---|---|---|---|---|
| 0-1 | CODE | Order code | X'0300' | Specify Group Operating (SGO) order code | X'0300' |
| 2 | CODE | Operation | X'01' | Keep group together as a print unit | At least one operation |
|  |  |  | X'02' | Keep group together for microfilm output |  |
|  |  |  | X'03' | Save pages |  |
|  |  |  | X'04' | Finish |  |
| 3 | UBIN | Group level | X'00'-X'FF' | Group level of Boundary groups to which the operation is to be applied | X'00'-X'FF' |

| Rank | Level number | Operation (for example, Print Job) | Operation number |
|---|---|---|---|
| High | F1 | Print unit | 01 |
|  | E4 | Finishing | 04 |
|  | D4 | Finishing | 04 |
| Low | C1 | Print unit (for example, Header Page) | 01 |

FIG.4

| Operation number | Level number |
|---|---|
| FF | 4 |
| FE | 3 |
| FD | 2 |
| FC | 1 |
| FB | 4 |
| ⋮ | ⋮ |
| 08 | 1 |
| 07 | 4 |
| 06 | 3 |
| 05 | 2 |
| 04 | 1 |
| 03 | 4 |
| 02 | 3 |
| 01 | 2 |
| 00 | 1 |

FIG.5

METHOD, SOFTWARE PRODUCT, AND COMPUTER TO GENERATE AND INTERPRET AN IPDS DATA STREAM

BACKGROUND OF THE INVENTION

The invention concerns a method, software product, and computer to generate and interpret an IPDS data stream, wherein a plurality of data specifying pages to be printed are combined into groups by means of the IPDS command XOH DGB, whereby a level is respectively assigned to each group. The IPDS data stream (Intelligent Printer Data Stream) is specified in Intelligent Printer Data Stream Reference, IBM, S544-3417-05, 6th Edition (Mar. 1996), incorporated herein by reference. The commands XOH DGB (Define Group Boundary) and XOH SGO (Specify Group Operation) are explained on pages 214-218 and 262.

Print data is conveyed with the IPDS data stream from a device which generates and administrates print jobs to a printer via a data line. A controller of the printer converts the IPDS data stream into a control signal to control a print unit. An IPDS data stream comprises image data that typically specifies a page to be printed and control data that specifies general control events. In the data stream, the image data and the control data are typically arranged alternating successively, whereby individualized control data can also be comprised in the framework of the image data.

With the instruction XOH SGO, a command that is valid for a group of print data, in particular a group of print data describing a plurality of pages, is transmitted to a printer. This command (that is designated as an operation) is stored by the printer and implemented on the entire group of print data. A determined level is associated with this group. Within the group, a subgroup can again be grouped with the XOH DBL instruction, for which a further command is valid. This subgroup is assigned a further level with a lesser value than the level of the group above.

FIG. 1 shows an example of a data stream in which different levels are defined, whereby the levels are correspondingly marked. To simplify FIG. 1, the instruction "XOH SGO" is abbreviated as "SGO", and the instruction "XOH DGB" is abbreviated as "DGB". These abbreviations are also retained in the further specification.

First, the individual levels are defined with the instruction SGO, whereby the levels are designated as X80, X60, X40, X20, and a specific operation that is designated with X01, X03 or X04 is assigned to each level, whereby the letter "X" denotes a hexadecimal number. However, it is omitted in the following.

According to the current specification of the position detection system (FIG. 2), there are merely four different operations, namely one with the level number 01 for the operation that keeps the print data at a specific group together for a print job, one with the level number 02 for the command that keeps the print data together for the output of a microfilm, one with the level number 03 for the command to save the pages in the printer, and one with the level number 04 for the command "postprocess". The individual commands or operations can be more closely specified with the instruction DGB.

Before a DGB instruction can be used, the corresponding levels must be defined and an operation must be assigned to each level. The definition of the levels and the operations can thereby be cleared with solely an initialization of the system or of the printer. However, in running interference-free operation, it is not possible to implement such an initialization. This has the result that in the generation of a print data stream it must be exactly recorded which levels were defined and which operations were assigned to them. Since the use of a plurality of levels can result in very complex structures, in the generation of a print data stream it is often difficult, given the use of a plurality of levels, to prevent errors due to a false association of the operations to levels. Given the use of a level in the print data stream, each of them must be checked whether, for a specific operation to be implemented, a level can be found that is smaller than the current active level and that was not previously used in connection with another operation. It can thus be difficult to actually find a suitable level.

A print system comes from U.S. Pat. No. 5,592,683, incorporated herein by reference, in which commands for the preprocessing, for the print data, and for the post-processing are integrated into the data stream comprising the print data.

In the specification "UP$^3$I; Universal Printer Pre- and Post-Processing Interface", Version 1.02 (Jul. 2002), incorporated herein by reference and published by the firms Duplo International Ltd., Hunkeler AG, IBM Corporation, Océ Printing Systems GmbH and Strålfors AB that can be downloaded as data at the Internet address www.up3i.org, various control instructions are provided that can be used in the generation of a printed document to control different devices of a print production system, such as printing devices and these upstream and downstream devices such as, for example, winders, cutting devices, punching devices, stapling devices, and binding devices. It is thereby provided that such data are exchanged between the different devices, thus for example between a paper dispensing device and a print device.

On pages 134 to 141 of the UP$^3$I specification, examples are already cited as to how instructions for printing preprocessing devices or post-processing devices can be inserted into an AFP (MO:DCA) or IPDS data stream. With the UP$^3$I expansion, AFP applications can now comprise UP$^3$I control commands which are transmitted to a printer, whereby printer-specific data formats such as IPDS can be used. The UP$^3$I control data are thereby initially mixed with the print data and are first separated from them in the printer. The further devices of the print production system (i.e. preprocessing devices and post processing devices for the print material such as, for example, paper dispensers, winders, staplers, punchers, folding devices, cutting devices, and binding devices) can then be activated via the UP$^3$I interface of the printer.

With the level instructions cited above, various processing devices or processing steps can be associated with specific regions of the data stream. More is written on this in the German patent application Nr. 102 35 254.2, incorporated herein by reference.

The previously cited publications are hereby included by reference in the present application.

SUMMARY OF THE INVENTION

It is an object of the invention to generate an IPDS data stream in which the levels can be administered simply, and with which a data stream with a plurality of levels (that can also be nested) can be securely generated.

In a method and system for generating an IPDS data stream, print data describing a plurality of pages to be printed is combined into groups by an IPDS command "DGB". A level is respectively assigned to the groups whereby a specific operation number is respectively assigned in advance to the individual levels. The levels are respectively represented by a level number. The operations are respectively represented by an operation number. A linkage is provided between all level numbers and all operation numbers such that the level numbers can unambiguously be assigned an operation number. It is determined by means of the linkage which operation is assigned to a specific level.

BRIEF DESCRIPTION OF THE DRAWINGS

FIG. 1 is a typical prior art IPDS data stream with some levels;

FIG. 4 shows a linkage table for the first exemplary embodiment; and FIG. 5 is a further linkage table that shows the linkage between the level numbers and the operation numbers.

DESCRIPTION OF THE PREFERRED EMBODIMENTS

Figures 2, 3:
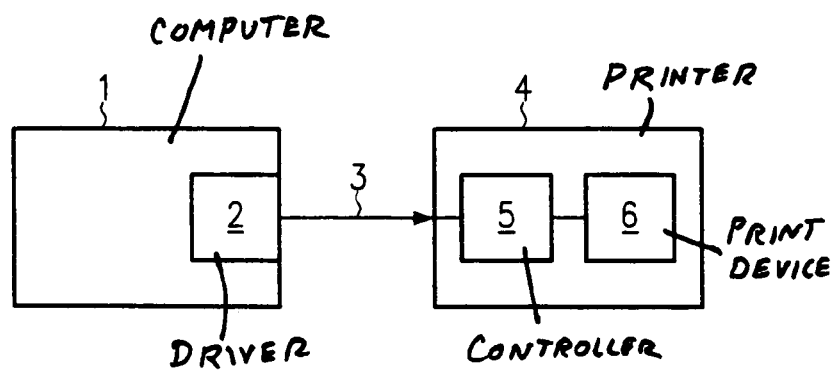
FIG. 2 shows the structure of the prior art IPDS command SGO.
FIG. 3 shows a prior art system on which the inventive method can be implemented.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

In the method to generate an IPDS data stream, a plurality of print data describing pages to be printed are combined by means of IPDS commands DGB into groups, a level is assigned to them, a specific operation is assigned in advance to the individual level, the levels are respectively represented by a level number, and the operations are respectively represented by an operation number.

The method is distinguished in that a linkage exists between all level numbers and all operation numbers such that the level numbers can unambiguously be assigned an operation number, and that by means of the linkage, it is determined in the generation of the print data stream which operation is assigned to a specific level, such that the determined level is used to implement the operation and is entered into the print data stream.

Since a linkage (via which a specific operation number is assigned to a specific level number) is established between the level numbers and the operation numbers, a specific operation is unambiguously assigned to an arbitrary level. Thus, in the selection of a new level to determine a new group of print data, it can simply and quickly be determined whether the level is suitable to implement a desired operation.

The method is based on the IPDS data stream specified above.

Print data that are generated and administered at a computer 1 are converted by a driver 2 (that is saved on the computer 1 and executed there) into an IPDS data stream that is transmitted to a printer 4 by means of a data line 3 (FIG. 3). The printer 4 comprises a controller 5 and a printing device 6. The controller 5 receives the data stream and converts the print data, using the control data comprised in the data stream, into control signals to control the print device 6, with which this prints the image described by the print data or the pages described by the print data, since in the IPDS data stream the individual packets of print data respectively represent a page.

In high-capacity printers that can print a large quantity of print data in a short time, the instructions SGO and DGB combine the print data into groups (i.e. that print data that describe a plurality of pages are processed together with one command) are increasingly executed. This has the result that the level structures become ever more complex.

A linkage between the level numbers and the operation numbers is established.

According to a first exemplary embodiment, the fact is used that the operation number as it is effected above can at present take only the values 1, 2, 3 and 4. The operation numbers are thus represented by the following three-digit binary numbers 001, 010, 011 and 100. As level numbers, only those numbers are used whose binary numbers coincide in the last three digits with the corresponding binary numbers of the operation numbers. The operation number is hereby respectively assigned to the level number that, as a binary number, coincides in its last three digits with one of the operation numbers. This means that the level that is described by this level number is only used to group print data on which the operation represented by the corresponding operation number is carried out. FIG. 4 shows an example for four typical level numbers F1, E4, D4, and C1. The operation number 1 is assigned to the level number whose last three bits represent a 1, thus the operation number 1, and therewith the operation "Combine a group of print data for the output to a print unit" is respectively assigned to the level numbers F1 and C1. The operation number 4 that, corresponding to the operation "in processing", is respectively applied to the level numbers E4 and D4. In the framework of the invention, it is also possible that for example the last four digits of the binary level number are respectively compared with the operation number, such that in hexadecimal notation the second digit of the level number coincides with the operation number. However, the number of the possible level numbers is significantly limited.

The above exemplary embodiment is suitable for four different operation numbers. Should the standard of the instruction SGO be changed, such that, for example, more than four different operation numbers m different operation numbers should be possible, that can be represented by an n-digit binary number. The above exemplary embodiment is to be modified such that the level number is associated with that operation number which coincides with at least n predetermined digits of the binary level number.

According to a second exemplary embodiment, the level number and the operation number are linked with one another as follows:

level number (module 4)+1=operation number

According to this formula, the integer remainder in a division by 4 is added to 1 and results in a number value between 1 and 4 that respectively corresponds to the operation number. The corresponding association table is shown in FIG. 5. In this linkage, an operation number is assigned to each level number such that in principle all level numbers can be used. More complex level structures are hereby generated than in the previous exemplary embodiment.

This example is likewise suitable for the use of four different operation numbers. Should a plurality of operation numbers be available, such as for example m operation numbers, the above formula must thus be modified as follows:

level number (module $m$)+1=operation number

In the frame of the system, it is also possible to design the linkage such that frequently occurring operations are associated with more levels than less frequently occurring operations. If there is, for example, the experience that in a printer type, the print data are predominantly combined for the output to the print unit (corresponds to operation number 1), and if an end processing (corresponds to operation number 4) seldom occurs, the operation number 1 can be associated more often with a level number than the operation number 4.

These linkage rules are integrated into the driver 2 of the computer 1, since the IPDS data stream is generated here and the individual levels are determined in the generation of the IPDS data stream. Since the level number of a new level must always be smaller than the level number of the last active superordinate level, the next smaller level number that is suitable for the desired operation that should be implemented with the group of print data comes from the level number of the last active superordinate level. The suitability of the level number is tested by means of the linkage that yields which of the corresponding operation numbers assigned to the next smaller level number. Naturally, it is also possible to use the reverse function in this check, i.e. that the largest possible level number is determined using the linkage by means of the operation number that corresponds to the desired operation.

The level number determined in this manner is then used to define the level in the print data stream by means of the operation SGO, and to denote the group of print data by means of the operation DGB.

Since an operation number is unambiguously associated with each level number, it is possible via the use of the corresponding linkage alone to prevent an incorrect double definition of specific levels for different operations. The defined levels correspond to the specification of the IPDS data stream and lead to no complications in the printer. With the linkage, it is therefore not necessary that complex tables are generated in which the individual definitions of the levels and their assignments to the operations are comprised, and in which it should additionally still be listed how the levels are structured among one another. In the method, it suffices to merely keep a one-dimensional list of the active levels in which the level numbers of the active levels are listed. If in the print data stream the end of the level (command: DGB Terminate) is executed, the corresponding level or its level number is thus deleted from the list.

The driver 2 is a software module or software product that is executed by computer 1. The system can therefore also be realized in the form of such a software product that also can be used on a data carrier for exchange between computer systems to generate an IPDS data stream. The controller 5 can alternatively be placed in the same mechanical housing as the printing unit, or can be separate from it as a separate modular unit. Furthermore, the controller can also control one or more other print preprocessing devices and/or post-processing devices to process printing material, such as paper and so forth.

The system concerns a method to generate an IPDS data stream.

In an IPDS data stream, different levels are defined with level numbers, thereby in each level a group of print data on which the same operation is executed are combined. The operations are defined by operation numbers.

The system is characterized in that a linkage exists between the level numbers and the operation numbers, and such that an operation number can unambiguously be assigned to a level number, such that it can be determined using the linkage which level is provided for which operation. It is not necessary to generate and to maintain complex tables in order to be able to administrate the level corresponding to the required specification.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for generating an intelligent printer data stream (IPDS), comprising the steps of:
    combining into groups print data describing a plurality of pages to be printed by an IPDS command "DGB";
    assigning a respective level to the groups whereby a specific operation number is respectively assigned in advance to the individual levels, the levels are respectively represented by a level number, and the operations are respectively represented by an operation number;
    providing a linkage between all level numbers and all operation numbers such that the level numbers can unambiguously be assigned an operation number;
    determining by means of the linkage which operation is assigned to a specific level; and
    wherein there are m operations, and the operation numbers assume only values i from 1 to m, so that via the linkage, the level number, whose modulo of m plus 1 corresponds to the operation number, is associated with that operation number.

2. The method according to claim 1 wherein all active levels are saved in a table.

3. The method according to claim 1 wherein the level number is an eight-digit binary number, the operation number is an n-digit binary number where n is smaller than eight, and the linkage is designed such that a specific level number is associated with the operation number that coincides with at least n predetermined digits of the level number.

4. The method according to claim 1 wherein frequently occurring operations are assigned to more levels than less frequently occurring operations.

5. The method according to claim 1 wherein an active list is maintained in which the level numbers of all active levels are entered.

6. A computer-readable medium encoding a software program comprising instructions for generating an intelligent printer data stream (IPDS) in a computer sending print data to a printer, by the steps of:
    combining print data describing a plurality of pages to be printed into groups by an IPDS command "DGB";
    respectively assigning a level to the groups whereby a specific operation number is respectively assigned in advance to the individual levels, the levels being respectively represented by a level number, and the operations being respectively represented by an operation number;
    providing a linkage between all level numbers and all operation numbers such that the level numbers are unambiguously assigned an operation number;

with the linkage determining which operation is assigned to a specific level; and wherein there are m operations, and the operation numbers assume only values i from 1 to m, so that via the linkage, the level number, whose modulo of m plus 1 corresponds to the operation number, is associated with that operation number.

7. A computer for generating an intelligent print data stream (IPDS) sent by the computer to a printer, comprising:

print data describing a plurality of pages to be printed being combined into groups by an IPDS command "DGB";

a level being respectively assigned to the groups whereby a specific operation number being respectively assigned in advance to the individual levels, the levels being respectively represented by a level number, and the operations being respectively represented by an operation number;

a linkage between all level numbers and all operation numbers such that the level numbers are unambiguously assigned an operation number;

the linkage determining which operation is assigned to a specific level; and wherein there are m operations, and the operation numbers assume only values i from 1 to m, so that via the linkage, the level number, whose modulo of m plus 1 corresponds to the operation number, is associated with that operation number.

8. A computer for interpreting a data stream for a printer, comprising: print data describing a plurality of pages to be printed being combined into groups by an IPDS command "DGB";

a level being respectively assigned to the groups whereby a specific operation number being respectively assigned in advance to the individual levels, the levels being respectively represented by a level number, and the operations being respectively represented by an operation number;

a linkage between all level numbers and all operation numbers such that the level numbers are unambiguously assigned an operation number;

the linkage determining which operation is assigned to a specific level; and wherein there are m operations, and the operation numbers assume only values i from 1 to m, so that via the linkage, the level number, whose modulo of m plus 1 corresponds to the operation number, is associated with that operation number.

9. The computer according to claim 8 wherein the computer is a controller to control at least one of a print device, a print pre-processing device, and a print post-processing device.

10. The computer according to claim 9 wherein the computer is mechanically separate from at least one of the print device, the print pre-processing device, and the print post-processing device.

11. A method for generating an intelligent printer data stream (IPDS), comprising the steps of:

combining into groups print data describing a plurality of pages to be printed by an IPDS command;

assigning a respective level to the groups whereby a specific operation number is respectively assigned to the individual levels, the levels are respectively represented by a level number, and the operations are respectively represented by an operation number;

providing a linkage between level numbers and operation numbers such that the level numbers can unambiguously be assigned an operation number;

determining by means of the linkage which operation is assigned to a specific level; and wherein there are m operations, and the operation numbers assume only values i from 1 to m, so that via the linkage, the level number, whose modulo of m plus 1 corresponds to the operation number, is associated with that operation number.

* * * * *